US012640059B2

(12) United States Patent
Williams

(10) Patent No.: US 12,640,059 B2
(45) Date of Patent: May 26, 2026

(54) SIMULATED WOUND SYSTEM FOR EMERGENCY MEDICAL TRAINING SIMULATION

(71) Applicant: Rhys Joseph Williams, Greenback, TN (US)

(72) Inventor: Rhys Joseph Williams, Greenback, TN (US)

( * ) Notice: Subject to any disclaimer, the term of this patent is extended or adjusted under 35 U.S.C. 154(b) by 748 days.

(21) Appl. No.: 17/937,877

(22) Filed: Oct. 4, 2022

(65) Prior Publication Data

US 2023/0105460 A1     Apr. 6, 2023

Related U.S. Application Data

(60) Provisional application No. 63/344,856, filed on May 23, 2022, provisional application No. 63/251,961, filed on Oct. 4, 2021.

(51) Int. Cl.
*G09B 23/34* (2006.01)
*G09B 23/30* (2006.01)
(52) U.S. Cl.
CPC ........... *G09B 23/34* (2013.01); *G09B 23/303* (2013.01)

(58) Field of Classification Search
None
See application file for complete search history.

(56) References Cited

U.S. PATENT DOCUMENTS

| | | | |
|---|---|---|---|
| 11,776,429 B2 | 10/2023 | Williams | |
| 2009/0298034 A1* | 12/2009 | Parry | G09B 23/30 |
| | | | 434/274 |
| 2023/0154356 A1 | 5/2023 | Williams | |
| 2023/0377486 A1 | 11/2023 | Williams | |

* cited by examiner

*Primary Examiner* — James B Hull
(74) *Attorney, Agent, or Firm* — Merchant & Gould P.C.

(57) ABSTRACT

A wound simulation system and method of providing medical training for dealing with objects embedded in a wound site is provided. The method embodies in a task trainer having a working structure with an embedded magnetizable material along a bottom surface thereof. The working structure is dimensioned and adapted to selectively receive training objects that may be removably retained in place by way of the underlying magnetizable material. The training objects may be placed at desired depths within the working structure. The training objects may be real-world materials made magnetizable for selectively associating with the embedded magnetizable material.

8 Claims, 4 Drawing Sheets

30

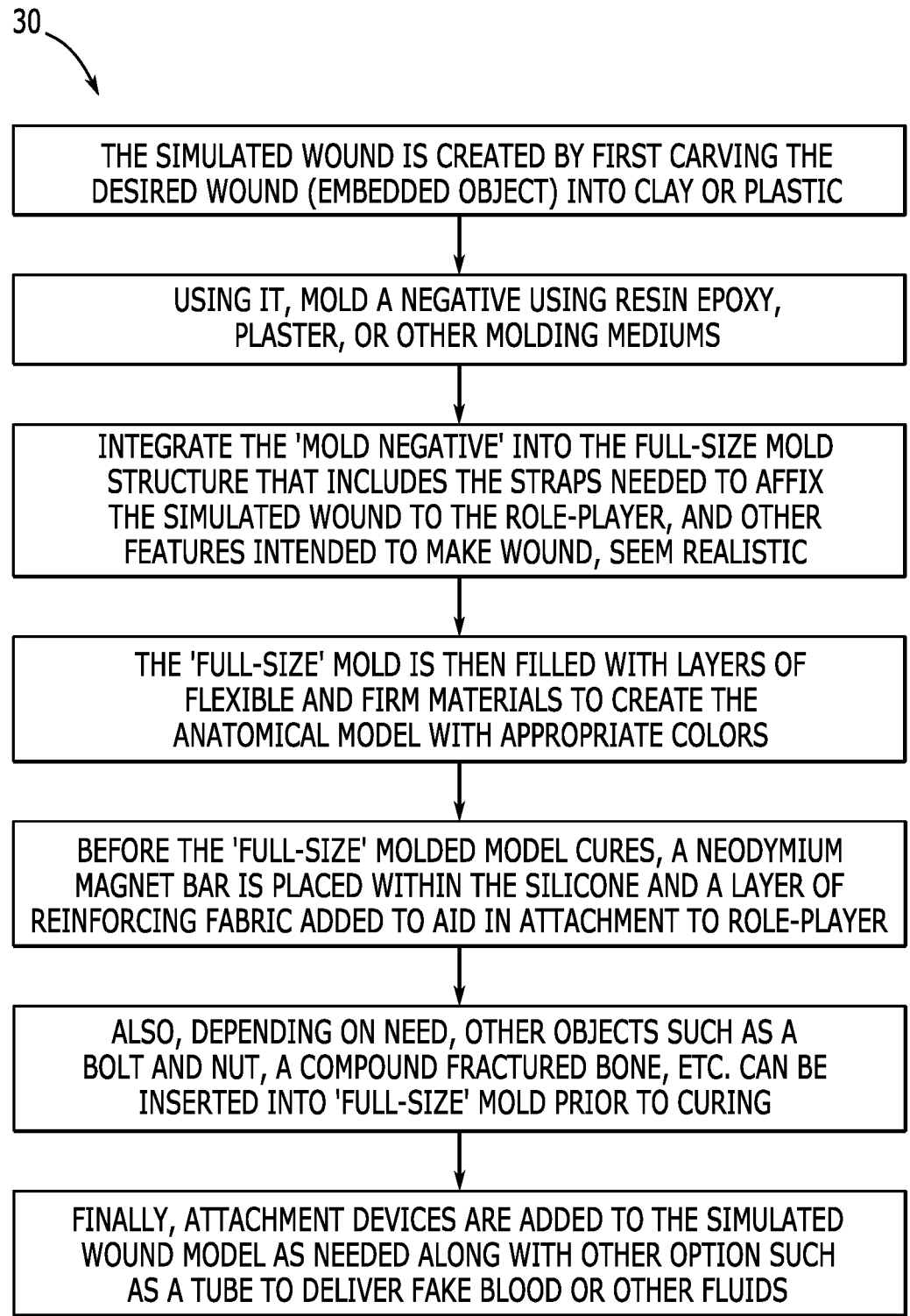

THE SIMULATED WOUND IS CREATED BY FIRST CARVING THE DESIRED WOUND (EMBEDDED OBJECT) INTO CLAY OR PLASTIC

USING IT, MOLD A NEGATIVE USING RESIN EPOXY, PLASTER, OR OTHER MOLDING MEDIUMS

INTEGRATE THE 'MOLD NEGATIVE' INTO THE FULL-SIZE MOLD STRUCTURE THAT INCLUDES THE STRAPS NEEDED TO AFFIX THE SIMULATED WOUND TO THE ROLE-PLAYER, AND OTHER FEATURES INTENDED TO MAKE WOUND, SEEM REALISTIC

THE 'FULL-SIZE' MOLD IS THEN FILLED WITH LAYERS OF FLEXIBLE AND FIRM MATERIALS TO CREATE THE ANATOMICAL MODEL WITH APPROPRIATE COLORS

BEFORE THE 'FULL-SIZE' MOLDED MODEL CURES, A NEODYMIUM MAGNET BAR IS PLACED WITHIN THE SILICONE AND A LAYER OF REINFORCING FABRIC ADDED TO AID IN ATTACHMENT TO ROLE-PLAYER

ALSO, DEPENDING ON NEED, OTHER OBJECTS SUCH AS A BOLT AND NUT, A COMPOUND FRACTURED BONE, ETC. CAN BE INSERTED INTO 'FULL-SIZE' MOLD PRIOR TO CURING

FINALLY, ATTACHMENT DEVICES ARE ADDED TO THE SIMULATED WOUND MODEL AS NEEDED ALONG WITH OTHER OPTION SUCH AS A TUBE TO DELIVER FAKE BLOOD OR OTHER FLUIDS

FIG. 5

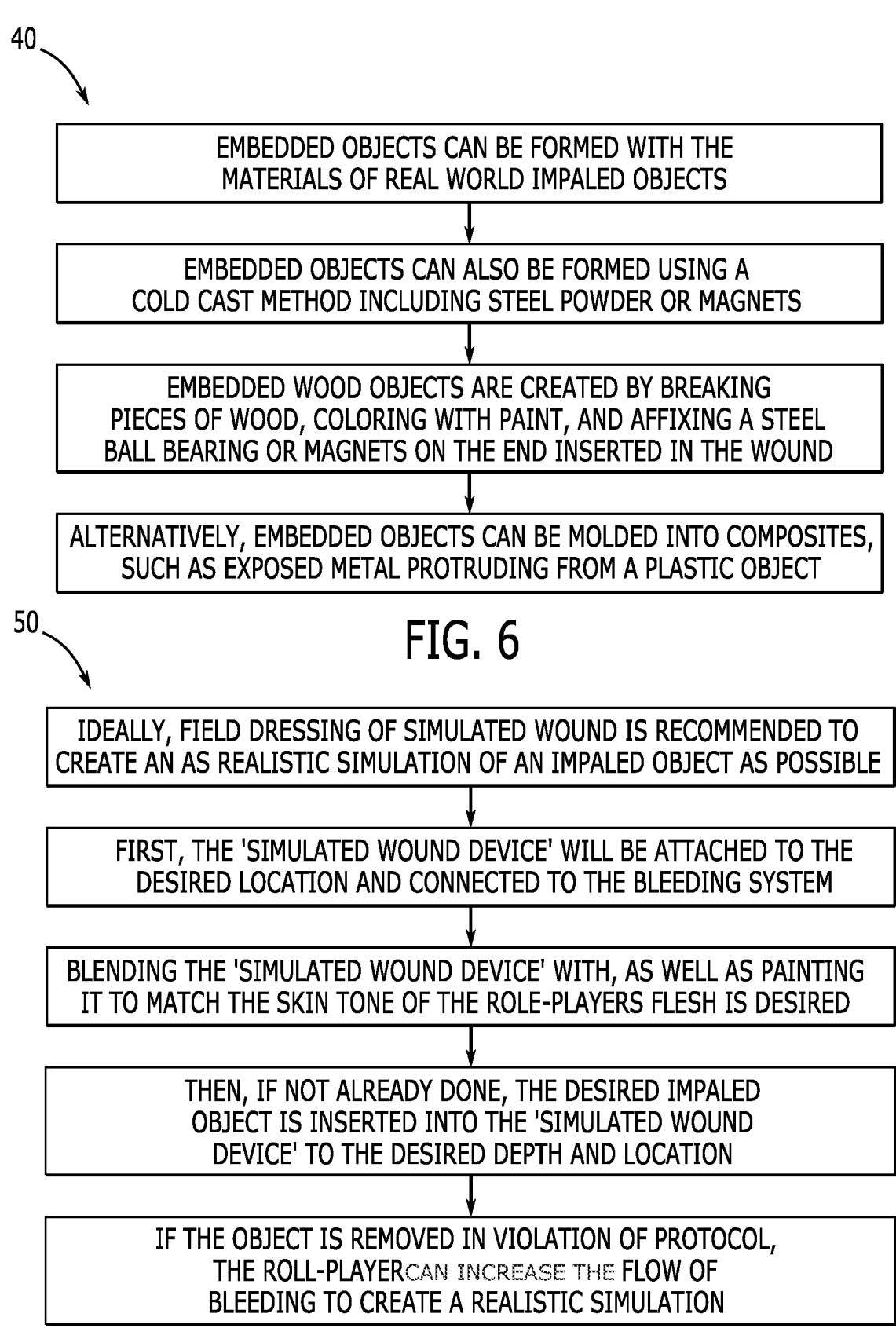

40

EMBEDDED OBJECTS CAN BE FORMED WITH THE
MATERIALS OF REAL WORLD IMPALED OBJECTS

EMBEDDED OBJECTS CAN ALSO BE FORMED USING A
COLD CAST METHOD INCLUDING STEEL POWDER OR MAGNETS

EMBEDDED WOOD OBJECTS ARE CREATED BY BREAKING
PIECES OF WOOD, COLORING WITH PAINT, AND AFFIXING A STEEL
BALL BEARING OR MAGNETS ON THE END INSERTED IN THE WOUND

ALTERNATIVELY, EMBEDDED OBJECTS CAN BE MOLDED INTO COMPOSITES,
SUCH AS EXPOSED METAL PROTRUDING FROM A PLASTIC OBJECT

IDEALLY, FIELD DRESSING OF SIMULATED WOUND IS RECOMMENDED TO
CREATE AN AS REALISTIC SIMULATION OF AN IMPALED OBJECT AS POSSIBLE

FIRST, THE 'SIMULATED WOUND DEVICE' WILL BE ATTACHED TO THE
DESIRED LOCATION AND CONNECTED TO THE BLEEDING SYSTEM

BLENDING THE 'SIMULATED WOUND DEVICE' WITH, AS WELL AS PAINTING
IT TO MATCH THE SKIN TONE OF THE ROLE-PLAYERS FLESH IS DESIRED

THEN, IF NOT ALREADY DONE, THE DESIRED IMPALED
OBJECT IS INSERTED INTO THE 'SIMULATED WOUND
DEVICE' TO THE DESIRED DEPTH AND LOCATION

IF THE OBJECT IS REMOVED IN VIOLATION OF PROTOCOL,
THE ROLL-PLAYER CAN INCREASE THE FLOW OF
BLEEDING TO CREATE A REALISTIC SIMULATION

FIG. 7

SIMULATED WOUND SYSTEM FOR EMERGENCY MEDICAL TRAINING SIMULATION

CROSS-REFERENCE TO RELATED APPLICATION

This application claims the benefit of priority of U.S. provisional application No. 63/251,961, filed 4 Oct. 2021 the contents of which are herein incorporated by reference. This application claims the benefit of priority of U.S. provisional application No. 63/344,856, filed 23 May 2022 the contents of which are herein incorporated by reference.

BACKGROUND OF THE INVENTION

The present invention relates to medical training simulation systems and, more particularly, a simulated wound system embodying a medical task trainer adapted to attach impaled objects selectively and magnetically for the purposes of enabling emergency medical training simulation.

Where high-fidelity simulators are invaluable in practicing a patient encounter, task trainers allow for the refining of psychomotor skills in isolation. Task trainers allow learners to familiarize themselves with various procedures that require repetitive practice in a safe environment before they are expected to perform the procedure on a real patient.

Currently, no trauma training device allows the user to selectively embed a foreign object into the simulated wound site without the used object passing through the medical task trainer that causes a hole, when used in conjunction with a simulated bleeding system, allows blood to leak through the device. Moreover, only objects designed for a specific medical task trainer can be used in a specific wound and only at a predetermined location and depth.

Currently, only a few wearable medical task trainers even allow the use of impaled objects, and the objections are predetermined, not removable, and limited to a specified location and depth in a prescribed area. These current systems do not allow the end users to change the type of object or placement of the object along and inside the task trainer.

As stated above, current systems do not allow for selective placement of the wound site and the objects that caused the simulated wound site. This is a critical error as it does not allow for removal and reposition of the simulated impaled object by the end user for important pedagogical reason during training. Thus, the inability to selectively place impaled objects within simulated wounds at the desired area limits the application of trauma simulation by the end user, thereby reducing training value and overall simulation fidelity.

In short, current wounds simulation systems make the end user embed the object in a specific location and depth with only one predetermined object that is made specifically for that medical task trainer.

As can be seen, there is a need for a simulated wound system embodying a medical task trainer adapted to attach impaled objects selectively and magnetically for the purposes of simulating a myriad of emergency medical training simulations. The system embodied in the present invention allows for multiple and different objects of different materials to be easily and quickly embedded into simulated wound task trainers; thereby allowing the end user to simulate multiple impaled objects into the various wound sites for a myriad of specific pedagogical reasons. The addition of the ability to embed various materials heightens training realism and fidelity, which in turn increases learning by the end user's students.

The system of the present invention allows the end user to embed a wide variety of objects in each wound and in multiple places along the medical task trainer, making each wound site unique. The variety of objects vary in size and composition, thereby enabling simulation of a wide array of real-world wounds, and so allowing the end user to create one specific wound of many possible wounds that meets their needs. As a result, the system of the present invention allows numerous configurations of wounds by end users, enabling variety in training and facilitating learning by participating students.

SUMMARY OF THE INVENTION

In one aspect of the present invention, a task trainer for training medical procedures related to objects embedded in tissue, the task trainer includes the following: a working structure having a thickness defined by a working surface and a bottom surface; a magnetizable or steel material disposed along the bottom surface; and one or more magnetizable or steel objects, wherein the working structure is made of at least one material adapted to be penetrated by each magnetizable objects so that a first end of the magnetizable object operatively associates with the magnetizable material and an opposing second end of the magnetizable object protrudes from the working surface.

In another aspect of the present invention, the task trainer may further including the following: a reinforcing cloth circumscribing the working structure so that it maintains its shape when penetrated; several attachment points connected to the working surface, wherein the thickness can be within a range of approximately a quarter of an inch to six inches, wherein a thickness of the magnetizable material is approximately one tenth that of the thickness of the working structure, wherein a portion of the working surface defines a wound site; and further including a bleed system fluidly coupled to the wound site, wherein at least one magnetizable object is made of wood with a ferromagnetic material coupled thereto.

In yet another aspect of the present invention, a method for training an embedded-object wound site protocol includes the following: attaching the above-mentioned task trainer to a role player by way of the two or more attachment points; embedding two of the one or more magnetizable objects at different depths into the working structure so as to comply with said protocol; and activating the bleeding system when either of the magnetizable object is removed in violation of said protocol.

These and other features, aspects and advantages of the present invention will become better understood with reference to the following drawings, description, and claims.

BRIEF DESCRIPTION OF THE DRAWINGS

FIG. 5 is a first flow chart 30 of an exemplary embodiment of the present invention.

FIG. 6 is a second flow chart 40 of an exemplary embodiment of the present invention.

FIG. 7 is a third flow chart 50 of an exemplary embodiment of the present invention.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a wound simulation system and method of providing medical training for medically treating objects embedded in a wound site. The method embodies a task trainer having a working structure with an embedded magnetizable material along a bottom surface of the working structure. The working structure is dimensioned and adapted to selectively receive training objects that may be removably retained in place by way of the underlying magnetizable material. The training objects may be placed at desired locations and depths within the working structure. The training objects may be real-world objects of non-magnetizable materials made magnetizable for selectively associating with the embedded magnetizable material.

Figures 1, 2:
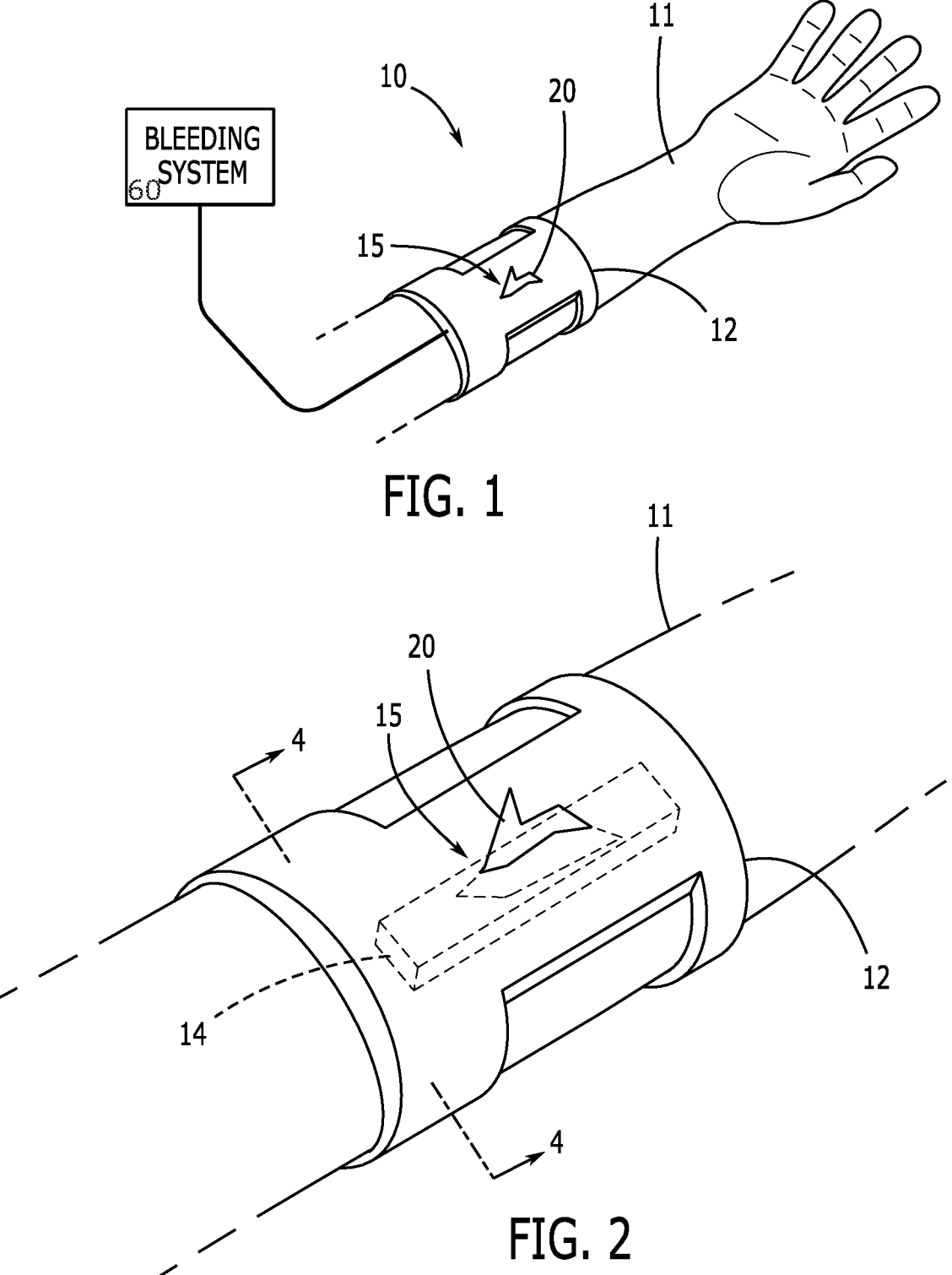
FIG. 1 is a perspective view of an exemplary embodiment of the present invention, illustrating a task trainer 12 in use.
FIG. 2 is a detailed perspective view of an exemplary embodiment of the present invention.
Figures 3, 4:
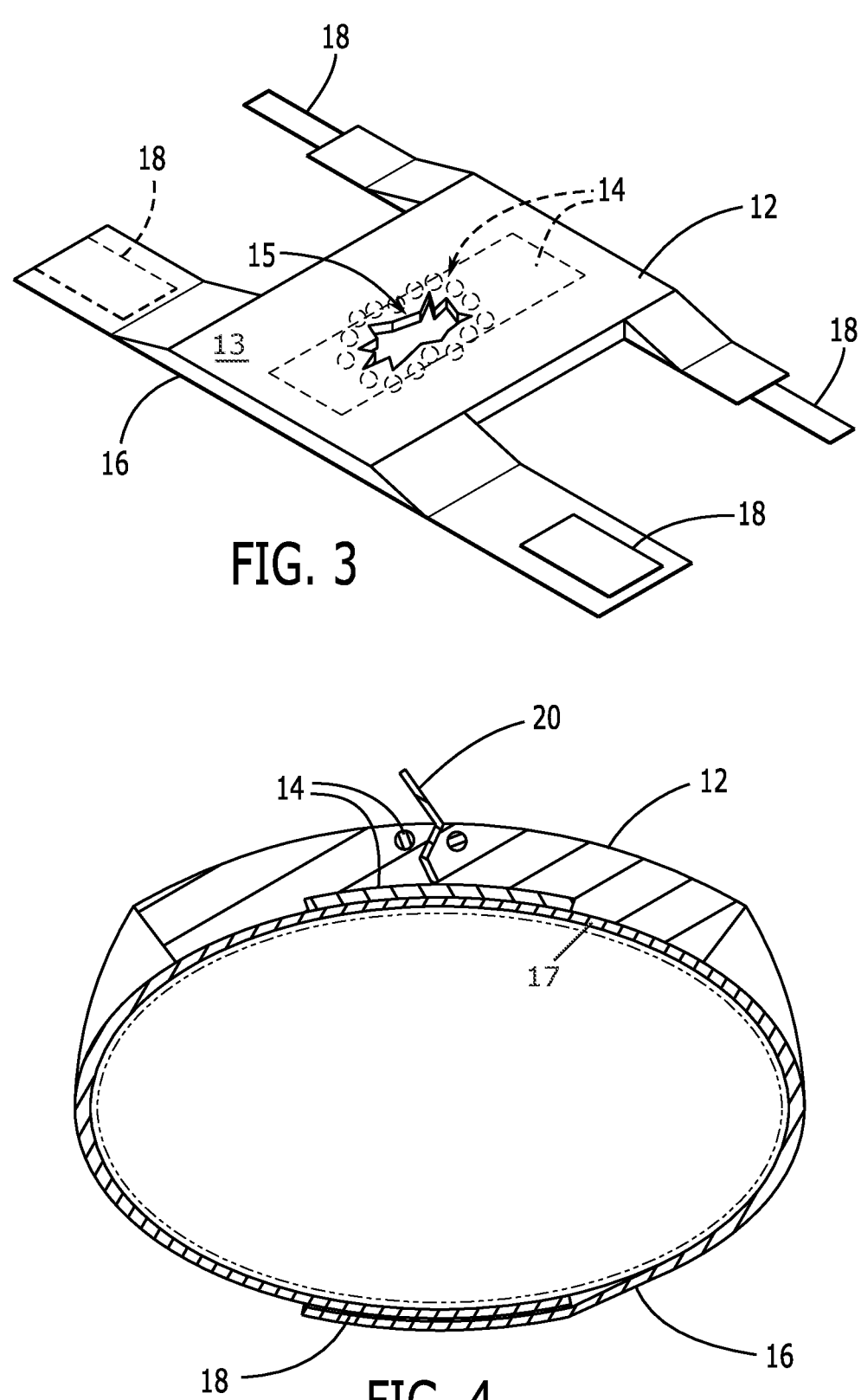
FIG. 3 is a perspective view of an exemplary embodiment of the present invention, showing the task trainer 12 in an open or flat condition.
FIG. 4 is a cross-section view of an exemplary embodiment of the present invention, taken along line 4-4 in FIG. 2.

Referring now to FIGS. 1 through 7, the present invention may include a simulated wound system 10 embodying a task trainer 12 for adaptive medical training. The task trainer 12 may be a layered structure, wherein the thicknesses of the layers and their size and shape may be adjusted to properly simulate the desired anatomical feature. A working structure 13 of the task trainer 12 may have a thickness between a quarter of an inch to approximately six or more inches, wherein the thickness of the overall task trainer 12 tapers downward as the working structure 13 transitions to attachment points 18. The overall thickness of the working structure 13 may be the result of multiple layers of silicone.

The attachment points 18 may include straps projecting from a periphery of the working structure 13. The attachment points 18 may be locations of detachable fasteners, such as straps with hook and loop fasteners, enabling the task trainer 12 to be removably connected to a role player 11 (e.g., a human user, a mannequin or the like). The working structure 13 may be reinforced with an external fabric 16.

A magnetizable or steel material 14 may be embedded in the working structure 13. A bottom substrate 17 may define the lower bounds of the working structure 13, and the magnetizable material 14 may engage or be adjacent to the bottom substrate 17. In certain embodiments, the magnetizable material 14 covers substantially the entirety of the bottom substrate 17, though that is not shown in the Figures. The thickness of the magnetizable material 14 may be approximately one-tenth that of the thickness of the working structure 13, though other ratios are possible.

The working structure 13 may be made of various materials and/or layers of materials that are receptive to puncture, wherein the structure immediately surrounding the puncture maintains its general shape. The working structure 13 may include multiple layers of silicone, polymerized siloxanes, polysiloxanes, or other equivalent polymers.

Accordingly, variously sized and shaped training objects 20 made from a ferromagnetic material (or that can be joined to a ferromagnetic material) that is capable of forming a magnetic attraction and thus magnetic connection to the magnetizable material 14 may be used to puncture the working structure 13, whereby the training object 20 remains protruding from the working structure 13 (above its exterior working surface). It is understood that the working surface may be defined by a cavity or void formed in the working structure 13, thereby mimicking a wound site 15 of missing (simulated) body tissue. The training object 20 may be non-magnetizable material, such as wood or plastic, that is easier to fashion (e.g., produced by additive manufacturing), wherein a ferromagnetic material is joined to this training object 20 for enabling the removably attachment purpose of the present invention. Note, a training object 20 can be larger than the imbedded magnetizable or steel material 14 contained in the simulated wound. Small training object 20 may be sized 1:1 to the wound site 15 opening (example: a 6-12" board could be attached to this system if the simulated wound can accommodate the impaled object 20).

A bleeding system 60 may be fluidly coupled or otherwise operatively associated with the simulated wound site 15 of the working structure 13, whereby if the impaled training object 20 is inappropriately removed, the bleeding system 60 can selectively generate simulated blood at the simulated wound site 15.

In certain embodiments, a user may create a desired simulated wound site 15 using the simulated wound system 10. This may be created by first carving the desired wound site 15 in clay, creating a mold of the wound site 15 (a negative thereof), then forming a shape of the outline of the wound site 15 and adding straps needed to affix the wound to the mannequin or role-player 11 with cord and adhesive. The mold may then be filled with colored silicone to match the role-player's skin tone and then the silicone is bound with a re-enforcing fabric. A neodymium magnet or steel bar, cube, sphere or square or other magnetizable material 14 may be placed inside the silicone prior to curing. The wound site 15 is allowed to dry, be demolded, and be painted to simulate the details a real wound. Then the user may embed one or more training object 20 formed with the material of a real impaled object. These objects can be formed by casting the actual object and molding with a cold cast method including steel powder.

Wood objects 20, for example, may be created by breaking pieces of wood, coloring the wood with paint, and affixing a steel ball bearing or neodymium magnet on the end that will be placed inside the wound site 15. Alternatively, a steel bolt or screw can be placed inside the object either by drilling or affixing a bolt with a nut. Bolts may also be molded within plastic objects with exposed metal end or affixing neodymium magnet onto or within to the object. Numerous objects could be made to enhance the realism of the wound using magnetic impaled objects. For example, clothing with magnets or steel attached can be inserted into the wound along with or without other impaled objects to create a realistic wound presentation. Any combination of metal or magnets can be used to create the same effect. For instance, metal could be inserted into the simulated wound site 15 and magnets be used exclusively to create the same interchangeable adhering effect.

In use, with the task trainer 12, a trainer inserts one or more training object 20 into the working structure 13 forming a magnetic connection within the working structure 13 via the magnetizable material 14. The one or more training object 20 may be inserted at a desired depth based on the training regimen sought to be taught. With the magnetizable material 14 being toward the bottom surface of the working structure 13, which in certain embodiment may be three inches or greater in thickness, the end-user may apply the simulated wound in the desired location and connect the bleeding system 60. The role-player 11 simulates the actions of an injured person and the end-user student treats the wound per protocol and instruction. If the training object 20 is removed in violation of protocol, the end-user can increase the flow of bleeding from the bleeding system 60 creating a realistic simulation of an impaled object.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down,"

and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A task trainer for training medical procedures related to objects embedded in tissue, the task trainer comprising:
   a working structure having a thickness defined by a working surface and a bottom surface;
   a magnetizable material disposed along the bottom surface; and
   one or more magnetizable objects, wherein the working structure is made of at least one material adapted to be penetrated by each magnetizable objects so that a first end of the magnetizable object operatively associates with the magnetizable material and an opposing second end of the magnetizable object protrudes from the working surface.

2. The task trainer of claim 1, further comprising a reinforcing cloth circumscribing the working structure so that it maintains its shape when penetrated.

3. The task trainer of claim 2, further comprising two or more attachment points connected to the working surface.

4. The task trainer of claim 3, wherein the thickness is approximately three inches.

5. The task trainer of claim 4, wherein a thickness of the magnetizable material is approximately one tenth that of the thickness of the working structure.

6. The task trainer of claim 5, wherein a portion of the working surface defines a wound site.

7. The task trainer of claim 6, wherein at least one of the one or more magnetizable objects is made of wood with a ferromagnetic material coupled thereto.

8. A method of training an embedded-object wound site protocol, the method comprising:
   attaching the task trainer of claim 6 to a role player by way of the two or more attachment points;
   embedding two of the one or more magnetizable objects at different depths into the working structure so as to comply with said protocol; and
   increasing a flow of bleeding when either of the magnetizable objects is removed in violation of said protocol.

* * * * *